US009194590B2

(12) United States Patent
Cescot et al.

(10) Patent No.: US 9,194,590 B2
(45) Date of Patent: Nov. 24, 2015

(54) COOKING EQUIPMENT AND A METHOD OF OPERATING A COOKING EQUIPMENT

(71) Applicant: ELECTROLUX PROFESSIONAL S.P.A., Pordenone (IT)

(72) Inventors: Paolo Cescot, Pordenone (IT); Riccardo Furlanetto, Pordenone (IT); Paolo Marcorin, Pordenone (IT); Erika Menosso, Pordenone (IT); Michele Simonato, Pordenone (IT)

(73) Assignee: ELECTROLUX PROFESSIONAL S.P.A., Pordenone (IT)

( * ) Notice: Subject to any disclaimer, the term of this patent is extended or adjusted under 35 U.S.C. 154(b) by 524 days.

(21) Appl. No.: 13/714,576

(22) Filed: Dec. 14, 2012

(65) Prior Publication Data
US 2013/0171305 A1    Jul. 4, 2013

(30) Foreign Application Priority Data

Dec. 16, 2011  (EP) .................................... 11194063

(51) Int. Cl.
F24C 15/00    (2006.01)
H05B 1/02     (2006.01)
A21B 1/40     (2006.01)
F24C 7/08     (2006.01)

(52) U.S. Cl.
CPC ................. F24C 15/00 (2013.01); F24C 7/087 (2013.01); H05B 1/0263 (2013.01); A21B 1/40 (2013.01); F24C 7/08 (2013.01)

(58) Field of Classification Search
None
See application file for complete search history.

(56) References Cited

U.S. PATENT DOCUMENTS

| 6,250,215 | B1 * | 6/2001 | Brenn ............................. 99/468 |
| 8,618,452 | B2 * | 12/2013 | Besore et al. ................. 219/702 |
| 2006/0231551 | A1 * | 10/2006 | Ruther et al. ................. 219/707 |
| 2011/0139140 | A1 * | 6/2011 | Baker et al. ................ 126/1 AD |
| 2013/0156917 | A1 * | 6/2013 | Cescot et al. ................. 426/510 |

FOREIGN PATENT DOCUMENTS

| DE | 102008028027 | 12/2009 |
| EP | 1251317 | 10/2002 |
| EP | 1712844 | 10/2006 |

(Continued)

OTHER PUBLICATIONS

European Search Report for EP11194063, dated Apr. 24, 2012, 2 pages.

Primary Examiner — Joseph M Pelham
(74) Attorney, Agent, or Firm — Pearne & Gordon LLP

(57) ABSTRACT

A cooking equipment includes a first database, containing first energy consumption data, indicating energy required to maintain, operating conditions prescribed by a cooking program stored in a control device, in the absence of food; and a second database, containing second energy consumption data-indicating additional energy to be supplied in excess of energy of the first energy consumption data to have a unit weight of the food processed according to the cooking program. The control device includes a processing unit that estimates daily energy consumption for the cooking program from the first and second energy consumption data. The first energy consumption data relate to respective individual iterations of the cooking process and include an initial energy excess associated with a first iteration of consecutive iterations of the cooking process; and a common energy level indicative of energy associated with subsequent iterations of the consecutive iterations of the cooking process.

15 Claims, 4 Drawing Sheets

(56) References Cited

FOREIGN PATENT DOCUMENTS

| | | |
|---|---|---|
| EP | 1998116 | 12/2008 |
| EP | 2042809 | 4/2009 |
| EP | 2101229 | 9/2009 |
| EP | 2159488 | 3/2010 |
| WO | 9700596 | 1/1997 |
| WO | 2012046165 | 4/2012 |

* cited by examiner

COOKING EQUIPMENT AND A METHOD OF OPERATING A COOKING EQUIPMENT

The present invention relates to a cooking equipment and to a method of operating a cooking equipment.

In particular, the present invention relates to a cooking equipment and to a method to which the following description refers purely by way of example without implying any loss of generality.

As is known, one typical application for professional ovens is the use in food service, specialized in production of few different recipes, or even a single one, repeated many times per day. This is the case, for example, of roast services which are commonly available in most supermarkets, where the chef needs to prepare only one kind of food, e.g. roasted chickens, in accordance with a single or few recipes and at most few parameters can be usually adjusted (e.g. degree of cooking, browning and so on). The same recipe or small set of recipes is repeated many times every day.

Since the power consumption of professional ovens is all but negligible, minimization of the daily power requirements is a primary target.

Methods have been proposed to optimize power consumption associated with cooking process, based on consumption per unit time and expected activation time of heat sources during execution of a given recipe. Professional ovens are in fact provided with several heat sources, such as electrical heaters, gas burners, microwave generators or steam generators, which may be activated and deactivated according to a cooking program, current temperature and humidity of the oven cavity and so on.

However, prediction of the activation time of heat sources is often far from accurate and, as a rule, it is strongly affected by variable parameters such as the amount of food in the oven cavity. At present, known methods suffer from such lack of accuracy, so it is impossible to gain a clear understanding of how daily planning affects the power consumption of the cooking process. Of course, this limitation is reflected in poorly effective power optimization.

On the contrary, accurate knowledge of daily consumption would permit a better planning, thus leading to global energy saving.

It is an aim of the present invention to allow to carry out cooking processes in accordance with reliable prediction of energy requirements.

In compliance with the above aims, according to the present invention there are provided a cooking equipment and a method of operating a cooking equipment as defined in the appended set of claims.

In particular, according to a first aspect thereof, the present invention relates to a cooking equipment comprising:
an oven cavity;
at least one energy source, operable to couple energy into food placed inside the oven cavity;
a plurality of sensors, configured to provide respective measurement signals, indicative of respective quantities relating to a cooking process for cooking food in the oven cavity;
a control device, having at least one cooking program stored therein and configured to drive the at least one energy source in accordance with the cooking program, based on the measurement signals from the sensors;
a first database, containing first energy consumption data, indicative of energy required to set and maintain, in the oven cavity, operating conditions prescribed by the at least one cooking program stored in the control device, in the absence of food; and
a second database, containing second energy consumption data, indicative of additional energy that is to be supplied in excess of energy of the first energy consumption data in order to have a unit weight of the food processed in accordance with the cooking program;
wherein the control device comprises a processing unit configured to determine an estimated daily energy consumption for the at least one cooking program from the first energy consumption data and the second energy consumption data.

The first energy consumption data may relate to respective individual iterations of the cooking process.

The first energy consumption data may include:
data indicative of an initial energy excess associated with a first iteration of a plurality of consecutive iterations of the cooking process; and
a common energy level indicative of energy associated with subsequent iterations of the plurality of consecutive iterations of the cooking process.

Preferably, the cooking equipment comprises an interface, operable to determine a total number of iterations for the cooking process and an amount of food to be processed, and the processing unit is configured to determine the estimated daily energy consumption on the basis of the total number of iterations for the cooking process and the amount of food to be processed. The amount of food may be estimated, for example during the first few minutes of the cooking process, based on the time response of the temperature of the oven cavity or of the food itself.

The interface may be operable to select one of a plurality of cooking programs stored in the control device.

Advantageously, the cooking equipment may comprise a steam generation unit controlled by the control device for providing steam within the oven cavity.

The sensors may comprise a first temperature sensor, for measuring a cavity temperature in the oven cavity; and a second temperature sensor, for measuring environmental temperature outside the oven cavity.

According to a further aspect, the present invention relates to a method of operating a cooking equipment, the cooking equipment comprising an oven cavity and at least one energy source, operable to couple energy into food placed inside the oven cavity;
the method comprising:
measuring quantities relating to a cooking process for cooking food in the oven cavity;
driving the at least one energy source in accordance with a cooking program, based on the measured quantities;
determining first energy consumption data, indicative of energy required to maintain, in the oven cavity, operating conditions prescribed by the at least one cooking program stored in the control device, in the absence of food;
determining second energy consumption data, indicative of additional energy that is to be supplied in excess of energy of the first energy consumption data in order to have a unit weight of the food processed in accordance with the cooking program; and
determining an estimated daily energy consumption for the at least one cooking program from the first energy consumption data and the second energy consumption data.

The method may comprise determining or adjusting a daily cooking program based on the estimated daily energy consumption.

The first energy consumption data may relate to respective individual iterations of the cooking process.

The first energy consumption data may include:
an initial energy excess associated with a first iteration of a plurality of consecutive iterations of the cooking process; and a common energy level indicative of energy associated with subsequent iterations of the plurality of consecutive iterations of the cooking process.

The step of determining first energy consumption data may comprise:

defining a test cooking program, including a number of iterations of a cooking process;

operating the cooking equipment in accordance with the test cooking program; and detecting the presence of the common energy level indicative when energy measurements associated with a number of consecutive iterations of the cooking process fall all within a check interval.

The common energy level may be determined on the basis of an average value of all energy measurements subsequent to the first energy measurement that falls within the check interval.

The initial energy excess may be determined by subtracting the determined common energy level from an energy associated with the first iteration of the cooking process in the test cooking program.

The method may also comprise determining a total number of iterations for the cooking process and an amount of food to be processed.

The method may also comprise determining the estimated daily energy consumption on the basis of the total number of iterations for the cooking process and the amount of food to be processed.

A non-limiting embodiment of the present invention will now be described, by way of example, with reference to the accompanying drawings, in which.

Figure 1:
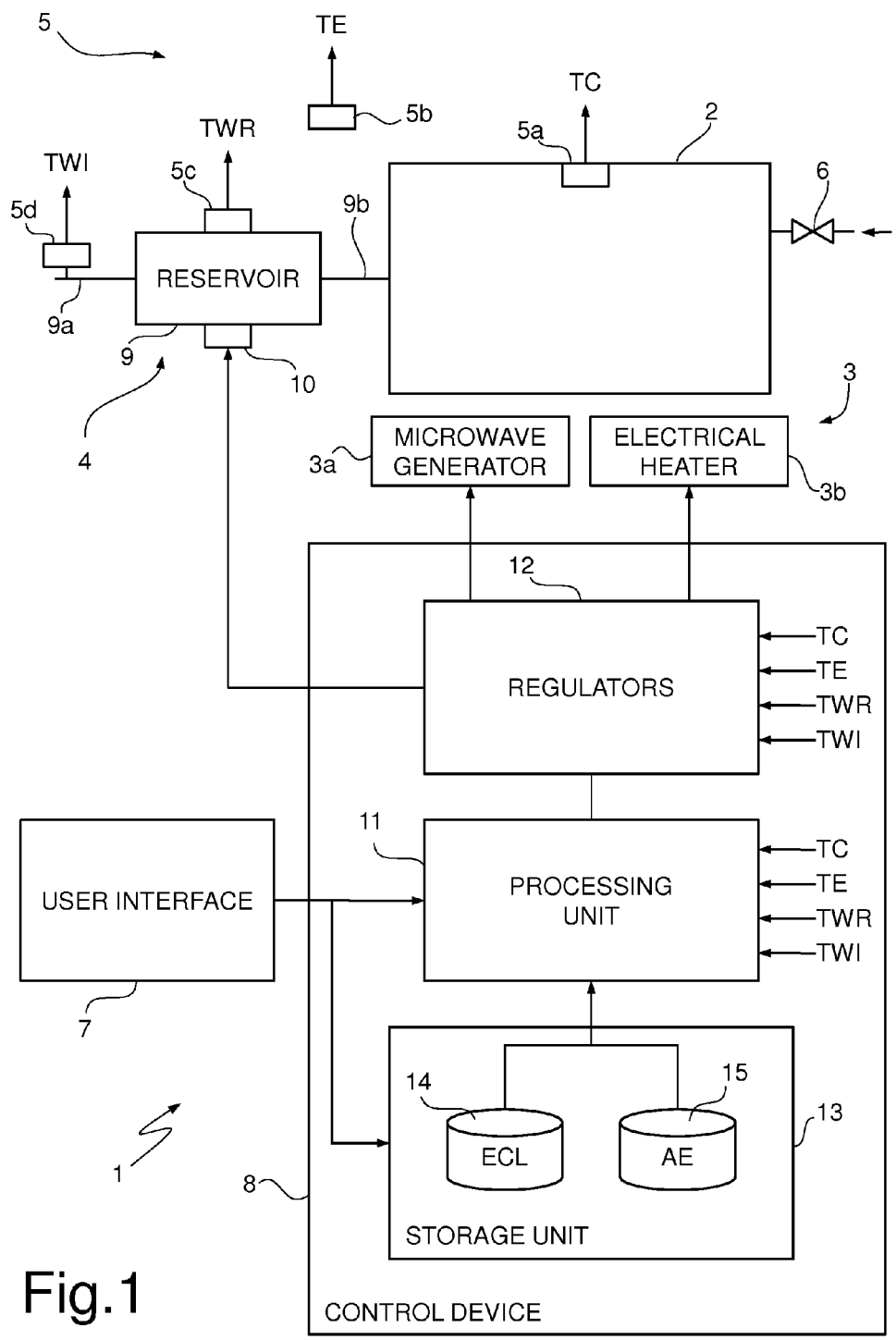
FIG. 1 is a simplified block diagram of a cooking equipment according to an embodiment of the present invention.

With reference to FIG. 1, referral number 1 indicates as a whole a professional cooking equipment, especially but not exclusively adapted for food services, represented in a schematic way.

The cooking equipment 1 comprises an oven cavity 2, for receiving food to be processed, a plurality of heating sources 3, at least one steam generation unit 4, for providing steam within the oven cavity 2, a plurality of sensors 5, a user interface 7 and a control device 8.

In one embodiment, the heating sources 3 comprise a microwave generator 3a, such as a magnetron, and an electrical heater 3b. In another embodiment, a gas burner may be provided in place of or in addition to microwave generator 3a and electrical heater 3b. A single heating source may be present, selected among the ones previously mentioned. The heating sources 3 are coupled to the control device 8 and selectively activated and deactivated in accordance with a cooking program stored therein. The heating sources 3 are furthermore coupled to the oven cavity 2 for delivering energy and heating food to be processed. When activated, the heating sources 3 provide energy into food placed in the oven cavity 2, thereby causing the food to heat up.

The steam generation unit 4, which may be gas or electrically operated, comprises a water reservoir 9, having an inlet 9a and an outlet 9b that feeds into the oven cavity 2, and an energy source 10. The energy source 10 is coupled to the water reservoir 9 and is operable by the control device 8 to provide a controlled amount of steam to the oven cavity 2. In another embodiment, here not shown, the steam generation unit 4 may comprise nozzles spraying water on electrical heaters or directly into the oven cavity 2.

A throttle valve 6 is operable by the control device 8 to supply fresh air from outside the oven cavity 2. Humidity in the oven cavity 2 may be thus maintained at a level determined by the cooking program in the control device 8.

In one embodiment, sensors 5 may include temperature sensors, such as:

a first temperature sensor 5a, for measuring a cavity temperature TC in the oven cavity 2;

a second temperature sensor 5b, for measuring environmental temperature TE outside the oven cavity 2;

a third temperature sensor 5c, for measuring a reservoir water temperature TWR in the water reservoir 9; and a fourth temperature sensor 5d, for measuring an inlet water temperature TWI at the inlet 9a of the water reservoir 9.

The sensors 5 may include also additional sensors, such as a sensor for measuring internal temperature of a piece of food in the oven cavity 2, humidity sensors for measuring a humidity level in the oven cavity 2 and a load sensor for measuring a weight of food in the oven cavity 2 (not shown).

The temperature sensors 5a-5d are coupled to the control device 8 for providing respective temperature signals STC, STWR, STWI, STE.

The user interface 7 is coupled to the control device 8 and provides input and selection functions. For example, the user interface 7 may allow to define cooking programs, store cooking programs in the control device 8, select and retrieve stored cooking programs from the control device 8, define a number of iterations for selected cooking programs, set parameters of selected cooking programs (e.g. cooking level, browning), start selected cooking programs.

The control device 8 is configured to operate the heating sources 3 and the steam generation unit 4 in accordance with cooking programs set or selected by a user through the user interface 7. In order to achieve accurate control of the cooking process, the control device 8 receives measurement signals from the sensors 5 and drives the heating sources 3 and the steam generation unit 4 to follow temperature and humidity profiles determined by the selected cooking program.

The control device 8 is further configured to process signals received from the sensors 5 (in particular by the temperature signals 5a-5d) in order to determine power consumption features of the cooking equipment 1 and expected daily energy consumption associated with selected cooking program and current operating conditions (such as ambient temperature and humidity, oven temperature TC and reservoir temperature TWR at the start of the cooking process and so on).

The control device 8 comprises a processing unit 11, regulators 12 and a storage unit 13, that includes a first database 14 and a second database 15. In particular, the storage unit 13 may include a single storage device, where both the first database 14 and the second database 15 are resident, or separate storage devices for the first database 14 and the second database 15.

The regulators 12 receive data relating to selected cooking program from the storage unit 13 and provide control functions of the heating sources 3 and of the steam generation unit 4.

The first database 14 contains first energy consumption data or ECL data (Energy Cooking Level), relating to energy required to reach and maintain, in the oven cavity 2, temperature and humidity conditions prescribed by each available cooking program in the absence of food for a single cooking cycle. As already explained, a typical use, albeit not the sole, of professional ovens is to perform few types of cooking processes, which are repeated many times. Each set of ECL data relate to a single iteration of a respective cooking process and account for energy to be supplied to maintain the oven cavity 2 at the temperature and humidity conditions prescribed by the cooking program for the respective cooking process. Moreover, ECL data relate to the empty oven cavity 2. In other words, ECL data is representative of the amount of energy needed to maintain an unbalance condition, in terms of temperature and humidity, between the oven cavity 2 without any food inside and the surrounding environment during a single cooking process. Therefore, the ECL data depend on the features of the cooking equipment 1 and are not correlated to the food to be processed.

The second database 15 contains second energy consumption data (indicated as AE data in FIG. 1), relating to additional energy that is to be supplied in excess of the ECL in order to have a unit weight of the food processed in accordance with the cooking program. Second energy consumption data are essentially determined by the kind and amount of food to be processed and the cooking program, but can be considered independent from the cooking equipment.

Figure 2:
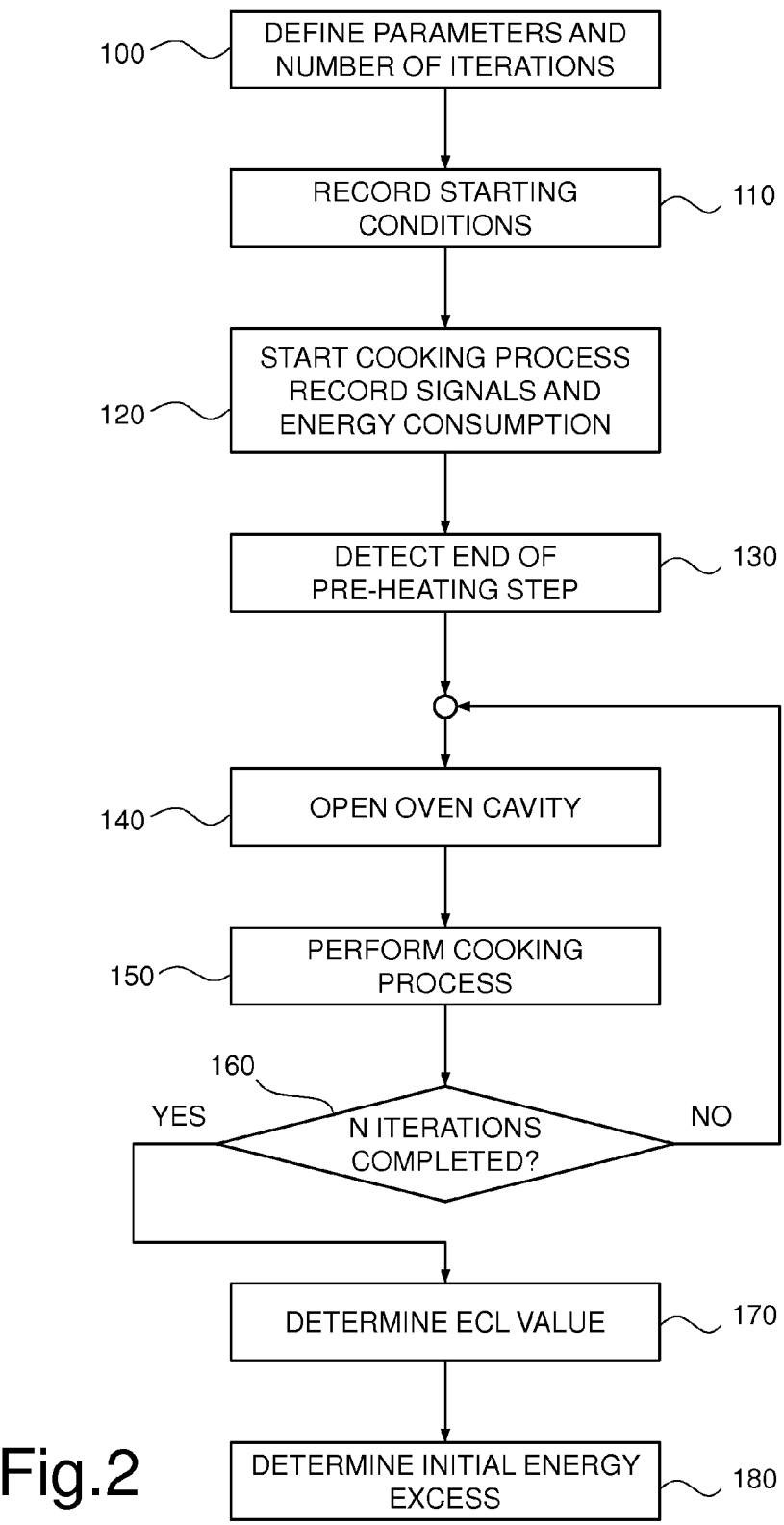
FIG. 2 is a flowchart relating to a first procedure of a method of operating a cooking equipment according to an embodiment of the present invention.

Procedures for determining ECL data will be hereinafter described, with reference to FIG. 2.

Once parameters and a number of iterations of a test cooking program have been set (block 100), starting conditions are recorded in the storage unit 13 (block 110). Parameters may include, for example, temperature profile, humidity profile, cooking level, browning. Starting conditions include at least the cavity temperature TC of the oven cavity 2 and the reservoir water temperature TWR in the water reservoir 9. Starting conditions are measured through the sensors 5 and may be represented by the temperature signals STC, STWR, STWI, STE and, possibly, by signals provided by sensors other than the temperature sensors 5a-5d.

With the oven cavity 2 and the steam generation unit 4 at thermal equilibrium with the surrounding environment, the process is then started by activating the heating sources 3 (block 120). At the same time, signals from the sensors 5 and energy consumption data are recorded in the storage unit 13.

End of a pre-heating step is detected when cooking conditions required by the test cooking program are reached (block 130).

The oven cavity 2 is then opened for a programmed period (e.g. two minutes), to account for losses caused by introduction of food (block 140) and the cooking process is then performed in accordance with the test cooking program (block 150).

Steps of opening the oven cavity 2 (block 140) and performing cooking (block 150) are repeated (block 160, output NO) until a number N of iterations of the cooking process have been completed (block 160, output YES).

Figure 3:
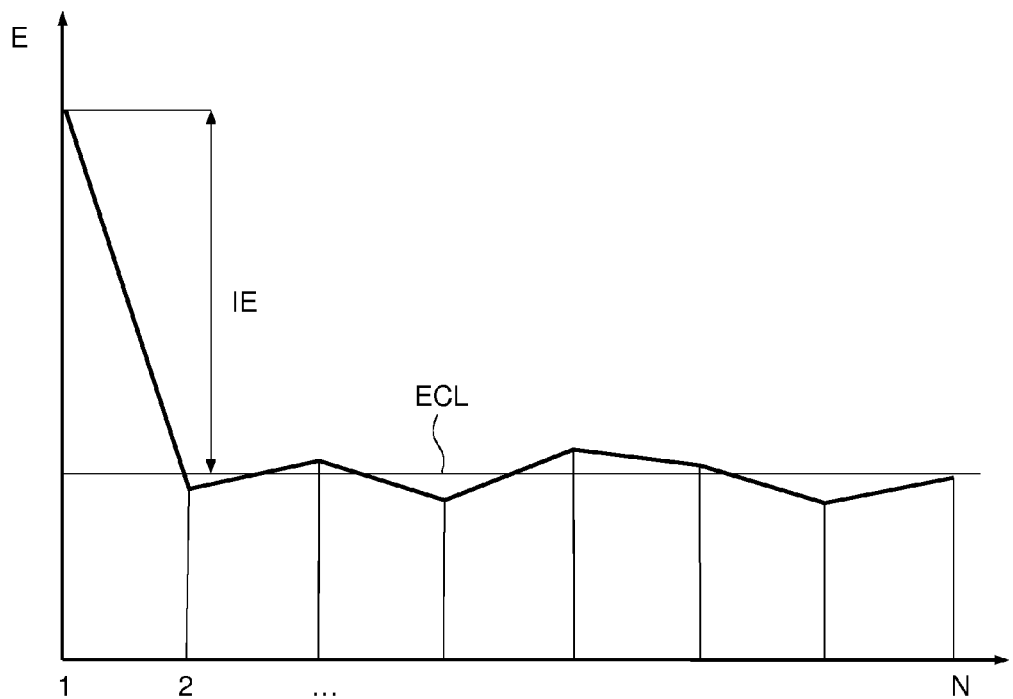
FIG. 3 is a graph showing quantities relating to the cooking equipment of FIG. 1.

Data recorded in the storage unit 13 are then processed by the processing unit 11. An exemplary plot of power consumption data is shown in FIG. 3. The graph depicts overall energy required by each iteration of the cooking process as a function of the iteration number.

Two main features are derivable from the graph:
an initial energy excess IE is required by the first iteration of the cooking process and is far greater than energy associated with subsequent iterations, because also energy needed for the pre-heating step is accounted for; and
the energy associated with subsequent iterations of the cooking process tend to a common ECL value.

The difference between energies of the first and of the subsequent iterations, as well as the ECL value, essentially depends on the cooking equipment and remain fairly unchanged if the whole procedure is repeated starting from comparable initial conditions, such as, for example, after leaving the cooking equipment off overnight.

The processing unit 11 determines the ECL value first (FIG. 2, block 170) and then the initial energy excess IE of the first iteration of the cooking process with respect to energy associated with subsequent iterations (block 180).

Figure 4:
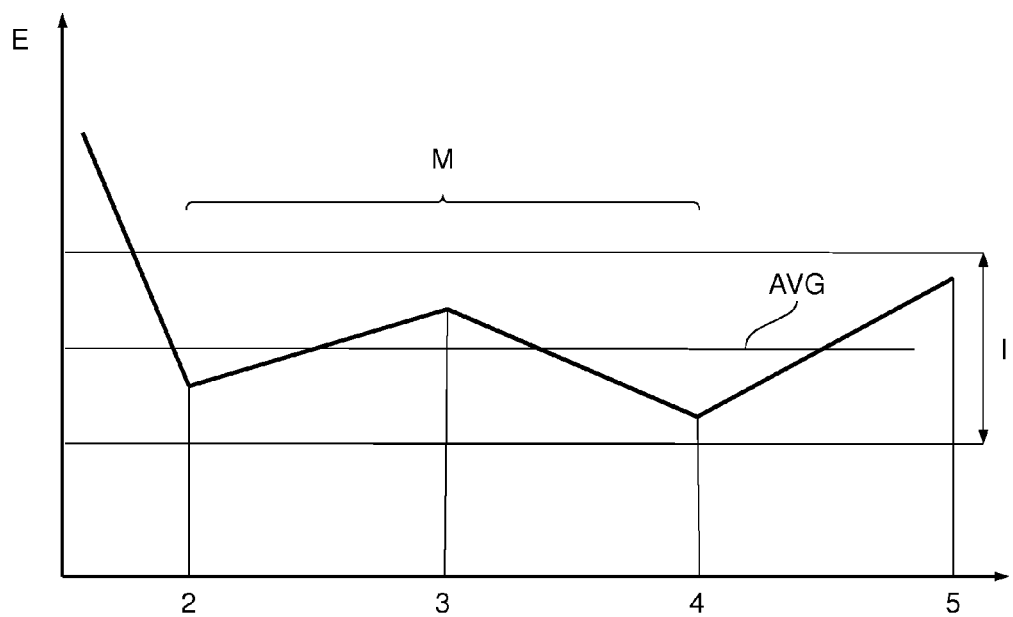
FIG. 4 is an enlarged detail of the graph of FIG. 3.

The presence of a common ECL value is detected when energy measurements associated with a number M of consecutive iterations of the cooking process fall all within a check interval I about an average value AVG of the same energy measurements (see FIG. 4, which shows a sketch of the plot of FIG. 3). For example, the width of the check interval I may be defined directly as a function of the average value (e.g. plus or minus a given percent of the average value) or as a function of the standard deviation (e.g. plus or minus a given percent of the standard deviation). The ECL value may be determined by the processing unit 11 as the average value of all energy measurements subsequent to the first energy measurement falling within the check interval I. It is worth noticing that the average value AVG and the ECL need not be exactly the same, even though the difference will be usually small.

The initial energy excess IE may be determined by subtracting the determined ECL value from the energy associated with the first iteration of the cooking process.

The processing unit 11 stores data indicative of the initial energy excess IE and the ECL value determined for the test cooking program in the first database 14. In particular, data indicative of the initial energy excess IE may be stored in the form of e.g. a difference value, a ratio of the initial energy excess to the ECL value or a percentage of the ECL value.

The processing unit 11 may derive second energy consumption data of the second database 15 from a further set of iterations of the cooking process with a known amount of food in the oven cavity 2. New iterations may be carried out once the ECL value has been reached and the second energy consumption data may be determined as the difference between the ECL value and the average energy consumption of the new iterations of the cooking process, normalized to the weight of the processed food.

Figure 5:
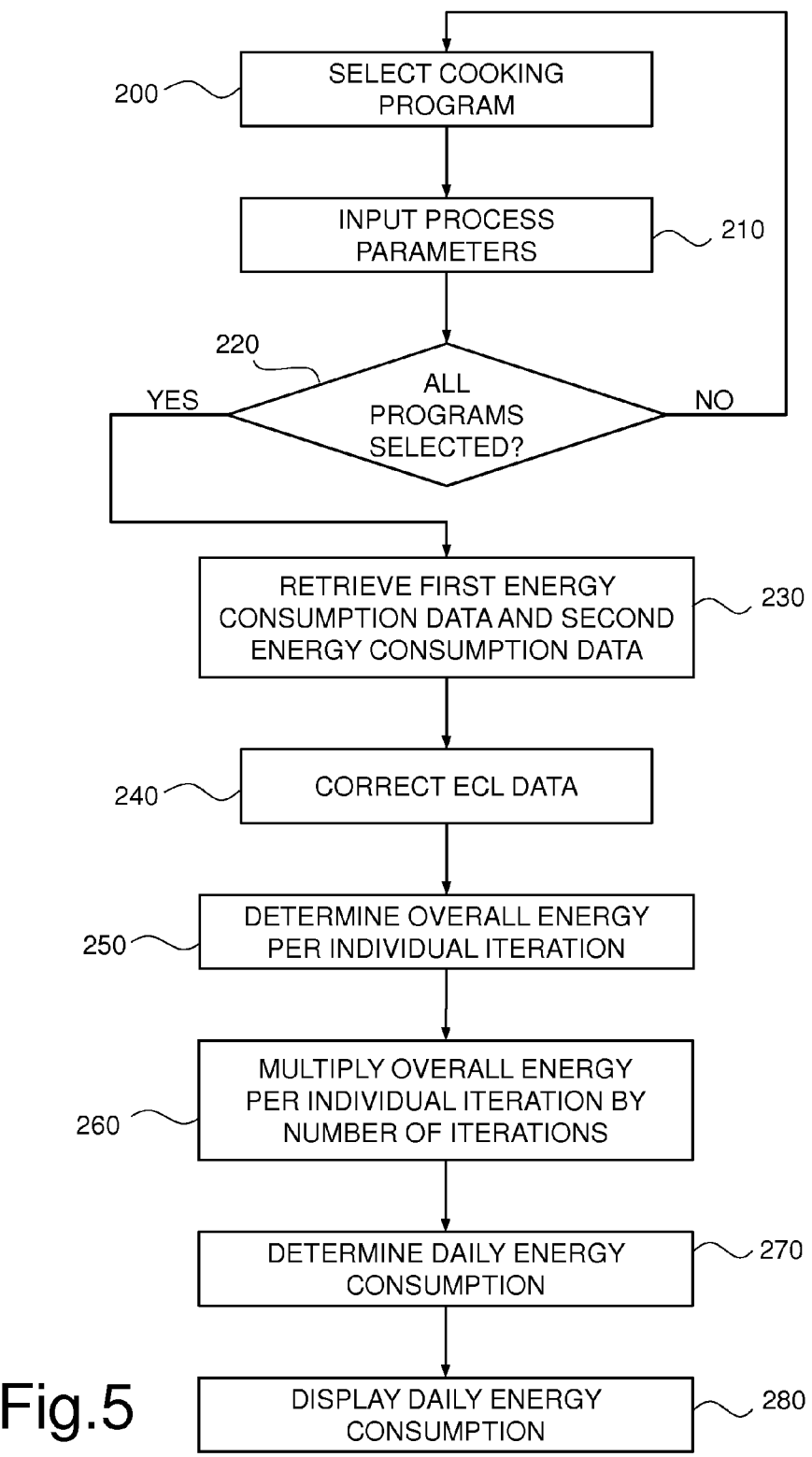
FIG. 5 is a flowchart relating to a second procedure of the method of FIG. 2.

FIG. 5 illustrates a procedure for determining an estimate of an expected daily energy consumption corresponding to a given cooking program and a given number of iterations.

A cooking program is initially selected from the storage unit 13 through the user interface 7 (block 200). At this stage, the user may also input process parameters and is requested to indicate the total number of iterations for the cooking process and a parameter relating to the amount of food to be processed (block 210), which may be e.g. the weight of food to be processed or a logic value indicative of a full load or partial load operating condition. The amount of food may also be estimated, for example during the first few minutes of the cooking process, based on the time response of the temperature of the oven cavity or of the food itself.

If more than one cooking process is to be carried out (block 220, output NO), steps at blocks 200 and 210 may be repeated as many times as required. When all cooking programs have been selected (block 220, output YES), the processing unit 11 then retrieves first energy consumption data (i.e. ECL data) from the first database 14, which correspond to the selected cooking programs, and second energy consumption data from the second database 15, which relate to the unit weight of the kind or kinds of food to be processed (block 230).

As already explained, ECL data include a initial energy excess IE for the first iteration of the cooking process and an ECL value. The processing unit 11 may also correct the ECL data on the basis of the input parameters and of current values of the measurement signals from the sensors 5 (240).

Then, the processing unit 11 adds the retrieved ECL value and the second energy consumption data, thereby obtaining the overall energy associated with individual iterations subsequent to the first one (block 250).

The overall energy per individual iteration is multiplied by the number of iterations input by the user (block 260) and the initial energy excess IE is added to determine the daily energy consumption (for one selected block 270). If several cooking processes are to be carried out, the initial energy excess IE for the subsequent cooking processes may be corrected as a function of the final conditions of the cooking equipment 1 at the end of the previous cooking process (in particular, as a function of the reservoir water temperature TWR, in one embodiment).

The estimated daily energy consumption thus obtained is made available (e.g. displayed) to the user for check (block 280). The user may determine or adjust the daily cooking program based on the estimated daily energy consumption. In particular, the user may revise daily plan of activities and adopt measures intended to improve efficient use of the cooking equipment 1 and to reduce the overall power consumption. For example, the user may reorganize activities to reduce the opening time and/or the number of openings of the oven cavity 2.

Additionally, the user may change the weight of food processed in individual iterations of a selected cooking program and the overall number of iterations, in order to find a balance that allows to have a given amount of food processed in one day and to minimize the estimated daily energy consumption. For example, if the estimated daily energy consumption appears to be too high, the user may decide to reduce the weight of food processed in individual iterations of a selected cooking program and to increase the overall number of iterations.

The cooking equipment and the method described above advantageously allow to provide reliable prediction of daily energy consumption. It should be emphasized that, once the first and second databases have been built, the starting conditions and the number of iterations of a cooking process are enough to determine the daily energy consumption. In particular, it is not required to have available information as overall duration of the cooking program, duration of individual iterations of the cooking process, start/end times or an estimate of the activation time of the heating sources. So, it is very quick and simple for users to request and obtain the estimated daily energy consumption.

Clearly, changes may be made to the cooking equipment and to the method as described herein without, however, departing from the scope of the present invention as defined in the appended claims.

The invention claimed is:

1. Cooking equipment comprising:
   an oven cavity (2);
   at least one energy source (3), operable to couple energy into food placed inside the oven cavity (2);
   a plurality of sensors (5), configured to provide respective measurement signals (STC, STWR, STWI, STE), indicative of respective quantities relating to a cooking process for cooking food in the oven cavity (2); and
   a control device (8), having at least one cooking program stored therein and configured to drive the at least one energy source (3) in accordance with the cooking program, based on the measurement signals (STC, STWR, STWI, STE) from the sensors (5);
   characterized by:
   a first database (14), containing first energy consumption data (ECL), indicative of energy required to set and maintain, in the oven cavity (2), operating conditions prescribed by the at least one cooking program stored in the control device (8), in the absence of food; and
   a second database (15), containing second energy consumption data (AE), indicative of additional energy that is to be supplied in excess of energy of the first energy consumption data (ECL) in order to have a unit weight of the food processed in accordance with the cooking program;
   wherein the control device (8) comprises a processing unit (11) configured to determine an estimated daily energy consumption for the at least one cooking program from the first energy consumption data (ECL) and the second energy consumption data (AE).

2. Cooking equipment according to claim 1, wherein the first energy consumption data (ECL) relate to respective individual iterations of the cooking process.

3. Cooking equipment according to claim 1, wherein the first energy consumption data (ECL) include:
   data indicative of an initial energy excess associated with a first iteration of a plurality of consecutive iterations of the cooking process; and
   a common energy level indicative of energy associated with subsequent iterations of the plurality of consecutive iterations of the cooking process.

4. Cooking equipment according to claim 1, comprising an interface (7), operable to determine a total number of iterations for the cooking process and an amount of food to be processed, wherein the processing unit (11) is configured to determine the estimated daily energy consumption on the basis of the total number of iterations for the cooking process and the amount of food to be processed.

5. Cooking equipment according to claim 4, wherein the interface (7) is operable to select one of a plurality of cooking programs stored in the control device (8).

6. Cooking equipment according to claim 1, comprising a steam generation unit (4) controlled by the control device (8) for providing steam within the oven cavity (2).

7. Cooking equipment according to claim 1, wherein the sensors (5) comprise a first temperature sensor (5a), for measuring a cavity temperature (TC) in the oven cavity (2); and a second temperature sensor (5b), for measuring environmental temperature (TE) outside the oven cavity (2).

8. Method of operating a cooking equipment (1), the cooking equipment (1) comprising an oven cavity (2) and at least one energy source (3), operable to couple energy into food placed inside the oven cavity (2);
   the method comprising:
   measuring quantities relating to a cooking process for cooking food in the oven cavity (2); and
   driving the at least one energy source (3) in accordance with a cooking program, based on the measured quantities;
   the method being characterized by
   determining first energy consumption data (ECL), indicative of energy required to maintain, in the oven cavity (2), operating conditions prescribed by the at least one cooking program stored in the control device (8), in the absence of food;
   determining second energy consumption data (AE), indicative of additional energy that is to be supplied in excess of energy of the first energy consumption data (ECL) in order to have a unit weight of the food processed in accordance with the cooking program; and determining an estimated daily energy consumption for the at least one cooking program from the first energy consumption data (ECL) and the second energy consumption data (AE).

9. Method according to claim 8, comprising determining or adjusting a daily cooking program based on the estimated daily energy consumption.

10. Method according to claim 8, wherein the first energy consumption data (ECL) relate to respective individual iterations of the cooking process.

11. Method according to claim 8, wherein the first energy consumption data (ECL) include:
   an initial energy excess associated with a first iteration of a plurality of consecutive iterations of the cooking process; and
   a common energy level indicative of energy associated with subsequent iterations of the plurality of consecutive iterations of the cooking process.

12. Method according to claim 11, wherein determining first energy consumption data (ECL) comprises:
   defining a test cooking program, including a number of iterations of a cooking process;
   operating the cooking equipment (1) in accordance with the test cooking program;
   detecting the presence of the common energy level indicative when energy measurements associated with a number (M) of consecutive iterations of the cooking process fall all within a check interval (I).

13. Method according to claim 12, wherein the common energy level is determined on the basis of an average value of all energy measurements subsequent to the first energy measurement that falls within the check interval (I).

14. Method according to claim 13, wherein the initial energy excess is determined by subtracting the determined common energy level from an energy associated with the first iteration of the cooking process in the test cooking program.

15. Method according to claim 8, comprising determining a total number of iterations for the cooking process and an amount of food to be processed, and determining the estimated daily energy consumption on the basis of the total number of iterations for the cooking process and the amount of food to be processed.

\* \* \* \* \*